United States Patent [19]

Martin

[11] 4,402,478
[45] Sep. 6, 1983

[54] PROCESS AND DEVICE FOR BRAKING A WIDE-TRACK AIRCRAFT TAXIING ON THE GROUND

[75] Inventor: Henri Martin, Saint-Nazaire, France

[73] Assignee: Societe Nationale Industrielle Aerospatiale, Paris, France

[21] Appl. No.: 239,361

[22] Filed: Mar. 2, 1981

[30] Foreign Application Priority Data

Mar. 11, 1980 [FR] France ............................... 80 05388

[51] Int. Cl.³ ...................... B64C 25/48; B60T 13/00
[52] U.S. Cl. .................................... 244/111; 188/16;
303/6 A; 303/15; 74/479
[58] Field of Search ........................ 244/111, 220–222,
244/235; 60/581, 561; 303/6 A, 6 R, 50, 6 C,
52, 98, 100, 22 R, 7, 10, 54, 15, 94, 93, 96;
188/16, 354, 349, 217, 345; 180/6.2, 6.7;
280/264; 137/636, 636.2, 637; 74/479; 192/13 R

[56] References Cited

U.S. PATENT DOCUMENTS

| | | | |
|---|---|---|---|
| 1,822,900 | 9/1931 | Messier | 188/354X |
| 3,142,965 | 8/1964 | Hazelbaker | 188/345 X |
| 3,316,031 | 4/1967 | Henry-Biaband | 303/50 |
| 3,350,142 | 10/1967 | Schuman | 303/10 X |
| 3,416,316 | 12/1968 | Lewis | 188/354 X |
| 3,423,136 | 1/1969 | Lohbauer | 303/54 |
| 3,834,769 | 9/1974 | Just | 188/354 X |
| 3,920,282 | 11/1975 | DeVlieg | 244/111 X |

FOREIGN PATENT DOCUMENTS

| | | |
|---|---|---|
| 1756129 | 2/1970 | Fed. Rep. of Germany . |
| 673646 | 1/1930 | France . |
| 717669 | 1/1932 | France . |
| 730775 | 8/1932 | France . |
| 735551 | 11/1932 | France . |
| 876301 | 11/1942 | France . |
| 762084 | 11/1956 | United Kingdom ............... 188/354 |

Primary Examiner—Douglas C. Butler
Attorney, Agent, or Firm—Merriam, Marshall & Bicknell

[57] ABSTRACT

The invention relates to a process and device for braking an aircraft taxiing on the ground. According to the invention, links are provided between the left-hand pedal and the right-hand brakes and, inversely, between the right-hand pedal and the left-hand brakes, so as to limit the yawing movements. The invention is particularly applicable to the braking of a wide-track aircraft.

9 Claims, 2 Drawing Figures

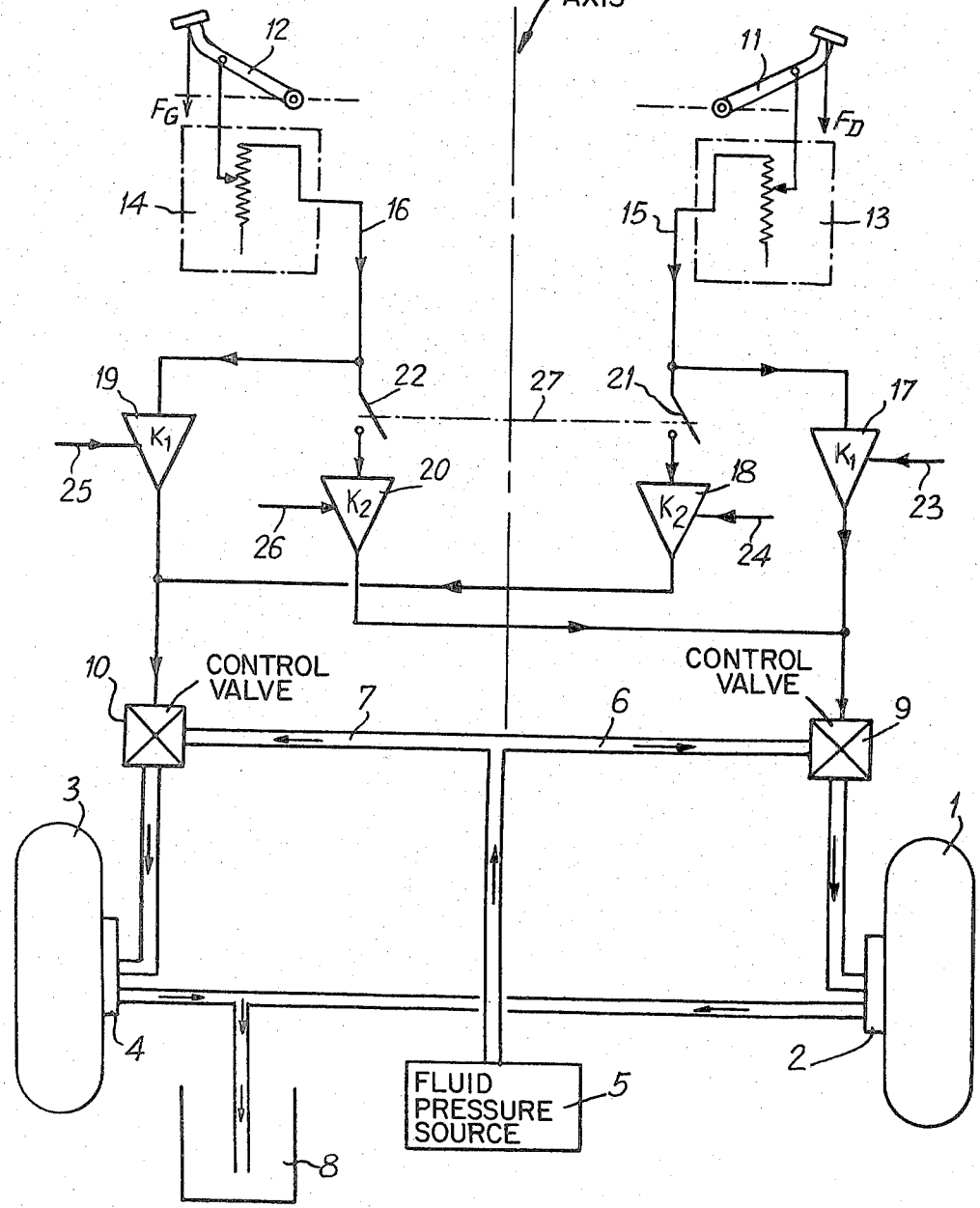

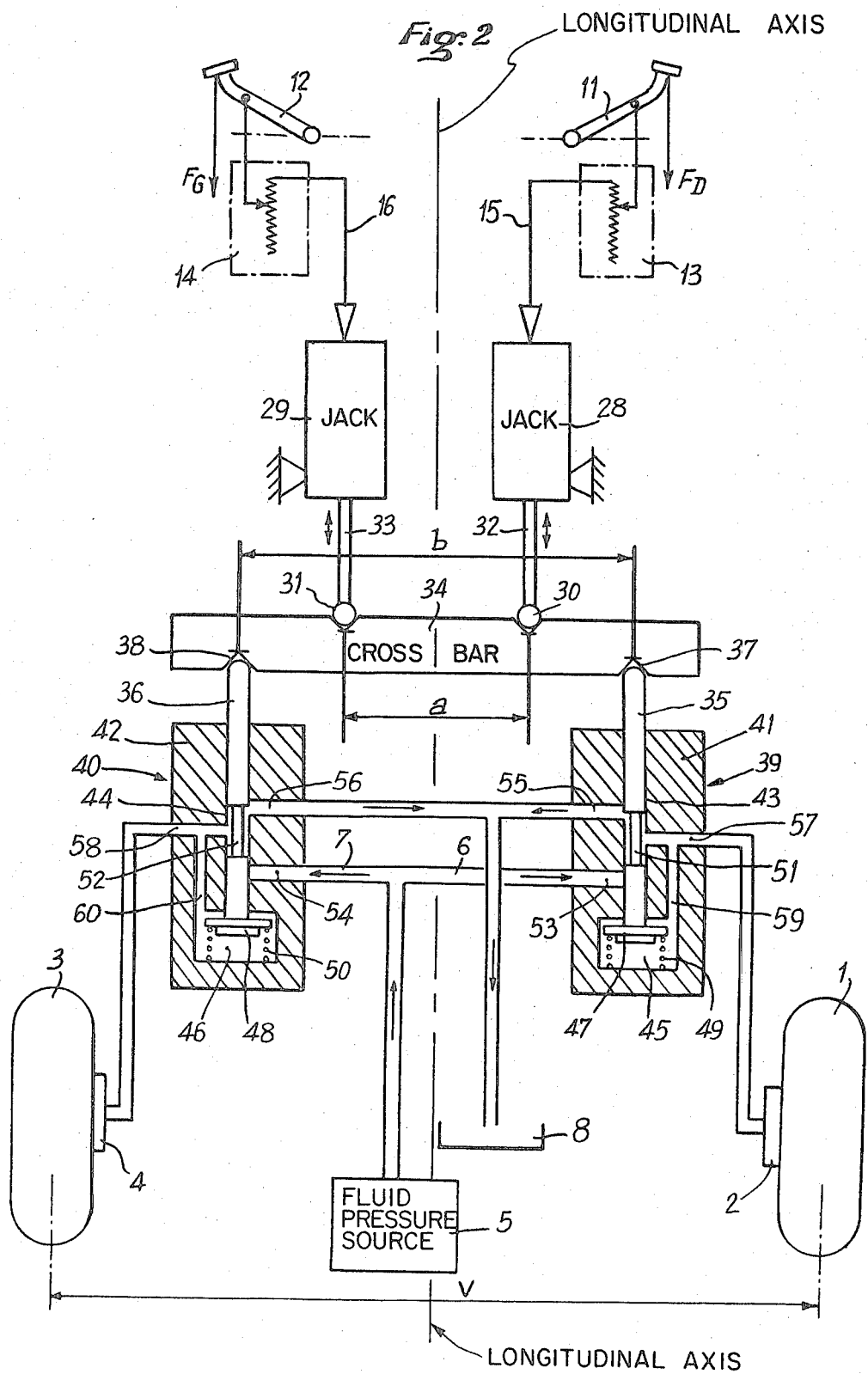

PROCESS AND DEVICE FOR BRAKING A WIDE-TRACK AIRCRAFT TAXIING ON THE GROUND

The present invention relates to a process and device for braking a wide-track aircraft taxiing on the ground.

The landing gear of aircraft is known to comprise two symmetrical groups of braked wheels, one of which is disposed to the right and the other to the left of the longitudinal axis of said aircraft. The brakes of these two groups of wheels are actuated by different pedals disposed side by side in the cockpit: the right-hand pedal actuates the brakes of the right-hand group of wheels, whilst the left-hand pedal actuates the brakes of the left-hand group of wheels.

Due to this arrangement, the pilot of the aircraft can brake one of the groups of wheels more strongly than the other, by exerting different actions on said pedals, with the result that the aircraft pivots about the first of these groups and, by such alternate braking actions which are more accentuated on one side than on the other, the pilot can direct the aircraft taxiing on the ground, on the runway. The aircraft therefore advances with yawing due to its dissymmetrical braking.

However, such yawing effects due to dissymmetrical braking may become too considerable and have too high an amplitude, in comparison with the overall deceleration to be obtained by braking, particularly when the track of the aircraft, i.e. the distance separating the two right-hand and left-hand groups of wheels, is large and when the yawing inertia is low.

It is an object of the present invention to remedy this drawback and to enable the yawing effects due to the dissymmetrical braking of a wide-track aircraft to be attenuated.

To this end, according to the invention, the process for braking an aircraft taxiing on the ground and provided, on the one hand, with a landing gear comprising two spaced-apart undercarriages, disposed on either side of the longitudinal axis of said aircraft and each provided with at least one wheel and braking means and, on the other hand, with two members actuatable by the pilot and respectively associated with the actuation of the means for braking said undercarriages, is noteworthy in that crossed links are established between each of said actuating members and the means for braking the undercarriage associated with the other of said members, so that, when one of said members is actuated, it causes, in addition to a direct braking action on the undercarriage with which it is associated, a crossed braking action, of lesser magnitude, on the undercarriage associated with the other member.

Thus, when one of said members (pedals) is actuated, not only the corresponding side is braked, but also, to a lesser extent, the opposite side. Consequently, tendencies to yawing are reduced.

In certain cases, particularly when taxiing to park, it is advantageous to be able to eliminate these crossed braking links, in order to increase the manoeuvrability of the aircraft in a turn.

The absolute and/or relative amplitudes of the direct and crossed braking actions are preferably made dependent on the taxiing speed. For example, since the yawing effect produced by differential braking forces applied to the wheels increases as the taxiing speed of the aircraft increases, the amplitude of the crossed-braking action relative to that of the direct action is suitably increased as the taxiing speed increases, thus reducing the differential force. Accordingly, when the aircraft is stopped or moving slowly, the crossed-braking action may be zero, while at high taxiing speed the crossed-braking action is a substantial proportion of the direct braking action.

In one embodiment of a device according to the invention, in which the brakes are actuated by a pressurised fluid under the control of electrovalves controlled by the electrical signals coming from two transmitters associated respectively with the actuating members, the output of each transmitter is connected, on the one hand, to the electrovalve of the associated undercarriage and, on the other hand, to the electrovalve of the undercarriage associated with the other transmitter, the amplification gain of the signal from the transmitter being greater in the first link than in the second.

In a variant embodiment, a pressure reducing valve is interposed in each conduit supplying fluid to the means for braking an undercarriage, said valve being controlled by a piston and the two pistons are preferably controlled by the ends of a mobile lever, engaged in its central part with elements for applying efforts representative of the efforts applied by the pilot on said actuating members. This device may comprise transmitters associated with jacks engaged with said lever. In this case, it is advantageous if the jacks and the pistons of the pressure-reducing valves are parallel to one another and disposed symmetrically with respect to an axis at right angles to said lever.

The invention will be more understood on reading the following description with reference to the accompanying drawings, in which:

FIG. 1 schematically illustrates a braking device according to the invention.

FIG. 2 schematically illustrates a variant embodiment of a braking device according to the invention.

Referring now to the drawings, the braking device schematically illustrated in FIG. 1 is adapted to brake the right-hand and left-hand braked groups of wheels of an aircraft, when it taxies on the ground.

In order to simplifly the drawing, the right-hand group of wheels is represented by one wheel 1, equipped with a brake 2. Similarly, the left-hand group of wheels is represented by one wheel 3, equipped with a brake 4.

Brakes 2 and 4 are supplied with pressurised fluid, from a source 5 connected to said brakes via conduits 6 and 7. Furthermore, the brakes 2 and 4 are connected to a hydraulic reservoir 8.

A control electrovalve 9 or 10 is provided in each of the conduits 6 and 7 supplying the brakes with pressurised fluid.

A right-hand pedal 11 and a left-hand pedal 12 are provided, in known manner, in the cockpit. These pedals are each connected to an electric transmitter 13 or 14, converting the effort of the pilot on the pedal, i.e. the depression of said pedal, into an electrical magnitude of which the value is a function of said effort.

The outputs 15 and 16 of the transmitters 13 and 14 are each connected to two amplifiers 17 and 18, on the one hand, 19 and 20 on the other hand.

Amplifiers 17 and 18 are mounted in parallel downstream of output 15 of the transmitter 13, whilst a switch 21 is provided between the amplifier 18 and the point common to the latter, the amplifier 17 and the output 15. The output of the amplifier 17 is connected to the input controlling the electrovalve 9 and that of the amplifier 18 is connected to the input controlling the electrovalve 10. The gain of the amplifier 17 is equal to $K_1$ and that of amplifier 18 to $K_2$, with $K_1 > K_2$.

Similarly, the amplifiers 19 and 20 are in parallel downstream of the output 16 of the transmitter 14, whilst a switch 22 is provided between the amplifier 19 and the point common to the latter, the amplifier 19 and the output 16. The output of the amplifier 19 is connected to the input controlling the electrovalve 10 and that of the amplifier 20 is connected to the input controlling the electrovalve 9. The gain of the amplifier 19 is equal to $K_1$ and that of amplifier 20 is equal to $K_2$.

Thus, when the pilot actuates the right-hand pedal 11 by exerting an effort $F_D$, and if the switch 21 is closed, a brake torque $K_1 F_D$ results on the wheel 1 and a brake torque $K_2 F_D$ on wheel 3.

Similarly, if the pilot actuates the left-hand pedal 12 by exerting a force $F_G$ and if the switch 22 is closed, a brake torque $K_1 F_G$ results on the wheel 3 and a brake torque $K_2 F_G$ on the wheel 1. By actuating the two pedals simultaneously, the torque resulting on wheel 1 is therefore $K_1 F_D + K_2 F_G$ and on wheel 3: $K_1 F_G + K_2 F_D$.

The gains $K_1$ of amplifiers 17 and 19 and $K_2$ of amplifiers 18 and 20 may be constant. However, they may be chosen to be variable in order to take into account the speed of the aircraft. For example, the gains $K_1$ of amplifiers 18 and 20 controlling the direct braking action of the wheels may decrease with increasing speed, to reduce the sensitivity of the main brakes, while that of amplifiers $K_2$ controlling the crossed-braking action may vary as necessary to decrease the differential braking action, as previously described. To this end, the amplifiers 17 to 20 comprise control inputs 23 to 26, connected, for example, to the output of a tachometer generator (not shown) fixed on the axle of a non-braked wheel of the aircraft (for example a wheel of the nose landing gear).

Moreover, at low speed, for example when the aircraft is manoeuvring to park, it is advantageous if the amplifiers 18 and 20 are out of circuit in order to increase the manoeuvrability of yawing of the aircraft. This placing out of circuit may be effected in the manner described hereinabove by means of a tachometer generator connected to a non-braked wheel. It may also be effected by opening the switches 21 and 22, actuated in common by a manual ganged control 27, within reach of the pilot. Of course, the control 27 also enables the switches 21 and 22 to be closed.

In the preferred variant embodiment of FIG. 2, wheels 1 and 3, their brakes 2 and 4, the hydraulic circuit 5, 6, 7, 8, the pedals 11 and 12, the transmitters 13 and 14 and their outputs 15 and 16, are to be found again.

In the device of FIG. 2, the outputs 15 and 16 of the transmitters 13 and 14 control jacks 28 and 29, for example electrically operated jacks, of which the cylinders are fixed to the frame of the aircraft. The ends 30 and 31 of the rods 32 and 33 of the cylinders 28 and 29 abut (or pivot) on a cross bar 34 symmetrically with respect to the centre thereof. The rods 32 and 33 of the jacks 28 and 29 are parallel to each other, to have parallel thrust axes; moreover, they are relatively close to each other and act on the central part of the cross bar 34.

Outside the ends 30 and 31, the cross bar 34 abuts by its ends (or pivots) on pistons 35 and 36. The bearing points 37 and 38 of the cross bar 34 on the pistons 35 and 36 are symmetrical with respect to the centre of the cross bar 34 and said pistons are parallel to each other and to rods 32 and 33.

The pistons 35 and 36 form part of hydraulic pressure reducing valves 39 and 40, provided with bodies 41 and 42, inside which are provided cylinders 43 and 44 in which said pistons 35 and 36 may slide with easy fit.

The cylinders 43 and 44 widen at their end opposite the cross bar 34 to form chambers 45 and 46, in which are housed shoulders 47 and 48 fast with the corresponding ends of the pistons 35 and 36. Springs 49 and 50, housed in chambers 45 and 46, press the pistons 35 and 36 in the direction of the cross bar 34.

Each piston 35 and 36 comprises an intermediate narrowed part 51 or 52, serving as slide between the fluid inlets 53 and 54 respectively connected to the source 5 via conduits 6 and 7, the fluid outlets 55 and 56 in the direction of the reservoir 8 and the fluid outlets 57 and 58 in the direction of brakes 2 and 4 respectively.

Moreover, communications 59 and 60 are provided between the outlets 57 and 58 and chambers 45 and 46 respectively.

When no action is exerted on the pistons 35 and 36, the latter are pressed upwardly in FIG. 2 under the action of the springs 49 and 50, so that the shoulders 47 and 48 are in abutment on the upper wall of the chambers 45 and 46 in which opens the respective cylinder 43 or 44. In this position, the lower parts of the pistons 35 and 36 close the inlets 53 and 54, whilst the narrowed part 51 or 52 places the outlets 57 and 58 in communication with outlets 55 and 56, respectively.

If a piston 35 (or 36) is made to descend, the upper part of said piston will eventually close the outlet 55 (or 56), whilst the narrowed part 51 (or 52) will place the fluid inlet 53 (or 54) in communication with the outlet 57 (or 58). The corresponding brake 2 (or 4) is therefore actuated and the wheel 1 (or 3) braked. However, due to the communication 59 (or 60), the chamber 45 (or 46) fills with pressurised fluid which exerts on piston 35 (or 36) an upward thrust provoking a reaction which opposes the control effort of the cross bar 34 at the bearing point 37 (or 38). Thus, the reduced pressure at the outlet 57 (or 58) is substantially proportional to the effort transmitted by the cross bar 34 to the bearing point 37 (or 38).

When the pilot acts on the pedal 11 (or 12), its effort $F_D$ (or $F_G$) is converted into an electrical magnitude by the transmitter 13 (or 14) and the output 15 (or 16) supplies the jack 28 (or 29), so that the effort transmitted by the rod 32 (or 33) is a function of said effort $F_D$ (or $F_G$). The cross bar 34 is therefore pressed by the end 30 (or 31). This results in that the pistons 35 and 36 are simultaneously lowered. However, due to the ratio of the distances between the end 30 (or 31) and the bearing points 37 and 38, the piston 35 (or 36) receives a greater effort than piston 36 (or 35). Each pedal 11 or 12 therefore actuates the brakes with which it is directly associated more strongly than the brakes associated directly with the other pedal.

Of course, when the aircraft is braked, the pilot may actuate pedals 11 and 12 simultaneously and the brake torques result from a combination of the actions described hereinabove.

If the distance between ends 30 and 31 is a and the distance between bearing points 37 and 37 is b, it has been verified that, as far as the pilot's feel and the reaction of the aircraft is concerned, everything occurs as if the track V of the aircraft had been multiplied by the reduction ratio b/a.

What is claimed is:

1. A method for braking an aircraft taxiing on the ground, said aircraft having a landing gear including two spaced apart undercarriages disposed on opposite sides of the longitudinal axis of said aircraft, each undercarriage carrying at least one wheel and braking means associated therewith; and two control members independently actuatable by a pilot and associated respectively with one of said braking means for controlling the braking action thereof;

which method comprises establishing between the control member associated with each of said wheels a crossed link with the braking means associated with the other of said wheels such that when a direct braking action is exerted on one of said wheels by actuation of its associated control member, a crossed braking action of lesser magnitude than said direct braking action is exerted on the other of said wheels.

2. A method in accordance with claim 1 wherein said crossed braking action varies with the speed of taxiing, being higher at high speed and lower at low speed.

3. Braking system for an aircraft taxiing on the ground, said aircraft having two laterally spaced wheels disposed on opposite sides of the longitudinal axis of the aircraft, said system comprising:

first and second braking means associated respectively with one of said wheels for producing a direct braking action on the associated wheel;

first and second control means associated respectively with said first and second braking means for controlling the braking action thereof, said control means being independently actuatable by a pilot; and crossed-link means associated with each of said control means for producing, when one of said control means is actuated to produce a direct braking action on its associated wheel, a crossed braking action of lesser magnitude on the other of said wheels.

4. A system in accordance with claim 3 wherein said braking means are actuated by means including a fluid under pressure.

5. A system in accordance with claim 4 wherein each control means comprises:

a control member independently actuatable by the pilot for controlling the braking action of the associated braking means;

an electrovalve for controlling said pressurized fluid;

a transmitter associated with said control member for producing two electrical signals whose magnitude depends on the extent of actuation of said control member, said electrical signals comprising a first signal supplied to the electrovalve associated with the braking means of one of said wheels; and a second signal having a magnitude smaller than said first signal, said second signal being supplied to the electrovalve associated with the braking means of the other of said wheels.

6. A device in accordance with claim 4 wherein each of said braking means comprises:

a conduit supplying said pressurized fluid;

a pressure reducing valve in said conduit; and a piston operatively controlling said valve;

said device further including a lever having its respective ends operatively associated with one of said pistons, and force applying means for applying to said lever between its ends two spaced forces representative respectively of the actuation of said control members.

7. A device in accordance with claim 6 wherein said force applying means comprises a pair of jacks engaging said lever, and a pair of transmitters each of which controls the actuation of one of said jacks, said transmitters being operatively associated respectively with one of said control members.

8. The device of claim 7, wherein said jacks and said pistons of the pressure reducing valves are parallel to one another and disposed symmetrically with respect to the centre of said lever.

9. The device of claim 8, wherein the two jacks are disposed on one side of the lever, whilst the two valves are disposed on the other side thereof.

* * * * *